US007782880B2

(12) United States Patent
Lai et al.

(10) Patent No.: US 7,782,880 B2
(45) Date of Patent: Aug. 24, 2010

(54) METHOD AND COMPUTER PROGRAM PRODUCT FOR A NEW NODE JOINING A PEER TO PEER NETWORK AND COMPUTER READABLE MEDIUM AND THE NETWORK THEREOF

(75) Inventors: Chung-Yi Lai, Changhua County (TW); Jui-Chieh Wu, Ban-Chiao (TW); Kuan-Jen Peng, Chung-He (TW); Polly Huang, Taipei (TW); Jayhsin Yao, Taipei (TW); Homer H. Chen, Taichung (TW)

(73) Assignee: Institute for Information Industry, Taipei (TW)

( * ) Notice: Subject to any disclaimer, the term of this patent is extended or adjusted under 35 U.S.C. 154(b) by 673 days.

(21) Appl. No.: 11/696,593

(22) Filed: Apr. 4, 2007

(65) Prior Publication Data
US 2008/0107122 A1 May 8, 2008

(30) Foreign Application Priority Data
Nov. 6, 2006 (TW) ............................... 95141017 A

(51) Int. Cl.
*H04L 12/56* (2006.01)
(52) U.S. Cl. ....................... 370/401; 707/101; 709/204; 709/213
(58) Field of Classification Search ................. 370/342, 370/401, 252; 709/220, 223, 224, 201, 231, 709/213, 204
See application file for complete search history.

(56) References Cited

U.S. PATENT DOCUMENTS

| 7,353,070 | B2 * | 4/2008 | Landou et al. ................. 700/19 |
| 7,664,727 | B2 * | 2/2010 | Van Doan et al. ................... 1/1 |
| 2004/0243665 | A1 * | 12/2004 | Markki et al. ................ 709/201 |
| 2006/0109831 | A1 * | 5/2006 | Tillotson ..................... 370/342 |
| 2007/0150558 | A1 * | 6/2007 | Teodosiu et al. ............ 709/220 |

OTHER PUBLICATIONS

Ganesh, Ayalvadi J., et al., "Peer-to-peer lightweight membership service for Large-scale group communication," Lecture Notes in Computer Science; vol. 2233; *Proc. Third Intl. Workshop Networked Group Comm.*, pp. 44-55 (2001).

* cited by examiner

*Primary Examiner*—William Trost, IV
*Assistant Examiner*—Emmanuel Maglo
(74) *Attorney, Agent, or Firm*—Patterson Thuente Christensen Pedersen, P.A.

(57) ABSTRACT

A peer to peer network, a method, a computer program product for a new node joining the network and a computer readable medium are disclosed. The peer to peer network comprises a plurality of nodes and a new node. Each of the nodes has its own partner list. Each of the partner lists records nodes that are able to provide data to the owner of the partner list. The nodes recorded in the partner list are called the partners of the owner of the partner list. When the new node intends to join the network, each of the nodes of the network decides whether to accept the new node according to the number of its partners but not according to a random manner. The stability of the network can be enhanced and the load of the network can be balanced.

30 Claims, 5 Drawing Sheets

200

METHOD AND COMPUTER PROGRAM PRODUCT FOR A NEW NODE JOINING A PEER TO PEER NETWORK AND COMPUTER READABLE MEDIUM AND THE NETWORK THEREOF

This application claims priority to Taiwan Patent Application No. 095141017 filed on Nov. 6, 2006, the disclosures of which are incorporated herein by reference in its entirety.

CROSS-REFERENCES TO RELATED APPLICATIONS

Not applicable.

BACKGROUND OF THE INVENTION

1. Field of the Invention

The subject invention relates to a Peer-to-Peer (P2P) network, a method and a computer program for a new node joining the network, and a computer readable medium thereof, specifically to a Peer-to-Peer network established by a plurality of nodes, each of the nodes able to transmit information to each other, a method and a computer program for a new node joining the network, and a computer readable medium thereof.

2. Descriptions of the Related Art

In the present P2P network architecture, a video streaming technique usually divides a video sequence of an image signal into a lot of video segments. A node intended to watch the video segments needs to join the P2P network group owning the video first, and then, requests the intended video segments for playing.

However, due to a limited bandwidth and a jammed condition of the network, almost every node can not receive all video segments. Therefore, the node in the network usually switches to request other nodes of the network for the video segments it lacks. At this time, nodes capable of being requested are called partner nodes of that node and there is a partnership between that node and the partner nodes. To form the partnership among nodes means how a node finds out one of other nodes agreeing the request and being capable of providing services to it and to become its partner node. The present technique for forming the P2P partnership is a peer-to-peer membership management for gossip-based protocol (also called a Scalable Membership Protocol, SCAMP).

The above-mentioned SCAMP is a gossip-based protocol utilizing a method of exchanging a state for spreading messages to achieve a purpose of finding out partners. Each node using the SCAMP comprises two kinds of data structures internally: a PartialView and an InView. The PartialView is used to record the node for providing video segments. In other words, a node can receive data from the nodes recorded in the PartialView. The node which provides video segments is defined as a providing peer or a partner. The InView is used to record the node receiving video segments. In other words, a node can transmit data to the nodes recorded in the InView. That node receiving data is called a consuming peer. Although messages can be transmitted quickly to each node in the P2P network by using this method, a stability of the P2P network depends on a success ratio of message transmission. Therefore, the method sometimes causes video data lost or the stability of the network decreasing and further makes the P2P network unstable and unreliable.

An example is shown below for explaining an operation principle of the SCAMP, that is, how to join a node to the P2P network and to find out the partner and to become a partner of other nodes. Please refer to FIG. 1. Nodes N1, N2, ..., N6 are existed nodes in the P2P network. A direction indicated by each arrow is the direction of a joining message which flows, while the direction of the joining message flows in an opposite direction of a data which flows. The description of the joining message will be explained later. In this example, the node N1 comprises five partner nodes, nodes N2, N3 and N6, respectively. The node N7 is a new node which desire to join the P2P network. First, the node N7 randomly chooses a contact node. The contact node is N1 in this embodiment. At the meantime, the node N7 transmits a joining message to the node N1 for requesting to join, and adds the node N1 to the PartialView of the N7. When the node N1 receives the joining message, the node N1 transmits the joining message to all its partners (N2, N3 to N6) by broadcasting. Every node receiving the joining message from the node N7 determines whether to add the node N7 to its PartialView. If one node determines not to join the node N7 to its PartialView, one of its partner nodes is randomly chosen from its PartialView and transmits the joining message of requesting to join to the partner node it randomly chooses. The randomly chosen partner node will re-determine whether to accept a joining request of the node N7. In the example, the nodes N3 and N6 determine to accept the joining request of the node N7, and the node N7 is added to their corresponding PartialViews, respectively. The nodes N2, N4 and N5 determine not to add the node N7 to their corresponding PartialViews, respectively. Therefore, the nodes N2, N4 and N5 each will transmit the joining request message according to the method mentioned above.

According the aforementioned descriptions, the random way is used for determining whether the new node joins to the P2P network. The random way affects a loading balance of the entire P2P network. For example, it is possible that a node with a large number of partner nodes still accepts a new node to become its partner in the P2P network, while other nodes may lost an opportunity of adding partners. The possibility for the group disconnection in the P2P network and the instability of the P2P network will increase. Consequently, how to enhance the stability of the P2P network and to balance the loading is an essential goal for the industry to improve.

SUMMARY OF THE INVENTION

One objective of the subject invention is to provide a peer-to-peer network comprising a plurality of nodes and a new node. Each of the nodes has a partner list for recording nodes being able to provide data to the node having the partner list. The nodes recorded on each of the partner lists are partner nodes of the node having the partner list. In the P2P network disclosed by this invention, when a new node wants to join this network, the node of the network evaluates the loading of its every partner node for determining to accept the joining request of the new node or not rather than determines it randomly. Consequently, the disclosed P2P network of this invention can effectively enhance stability of the network and balances loading of the network.

Another objective of the subject invention is to provide a method for a new node joining a P2P network. The P2P network comprises a plurality of nodes. Each of the nodes has a partner list for recording nodes being able to provide data to the node having the partner list. The nodes recorded on each of the partner lists are partner nodes of the node having the partner list. The method comprises the following steps: choosing one of a plurality of nodes as a contact node by the new node; transmitting a joining message to the contact node by the new code; transmitting the joining message to the partner nodes of the contact node by the contact node; conducting a probability calculation by each of the partner nodes of the contact node; deciding whether to add the new node to its partner list by each of the partner nodes of the contact node according to the probability calculation; choosing the partner node having a smallest partner list as a selected node from its partner list by each of the partner nodes deciding to refuse the new node; and transmitting the joining message to each of the selected nodes by the corresponding partner node.

Yet another object of this invention is to provide a computer program product for executing the aforementioned method. A further objective of this invention is to provide a computer readable medium for storing a computer program to execute the aforementioned method.

Yet a further objective of this invention is to provide a method for a new node joining a P2P network. The P2P network comprises a plurality of nodes. Each of the nodes has a partner list for recording nodes being able to provide data to the node having the partner list. The nodes recorded on each of the partner lists are partner nodes of the node having the partner list. The method comprises the following steps: choosing one of a plurality of nodes as a contact node by the new node; transmitting a joining message to the contact node by the new code; transmitting the joining message to the partner nodes of the contact node by the contact node; and deciding whether to add the new node to its partner list by each of the partner nodes of the contact node by comparing a number of partner nodes listed on its partner list with a predetermined lower-bound value and a predetermined upper-bound value.

Yet a further object of this invention is to provide a computer program product for executing the aforementioned method. Yet a further object of this invention is to provide a computer readable medium for storing a computer program to execute the aforementioned method.

The detailed technology and preferred embodiments implemented for the subject invention are described in the following paragraphs accompanying the appended figures for people skilled in this field to well appreciate the features of the claimed invention.

DESCRIPTION OF THE PREFERRED EMBODIMENT

Figure 1:
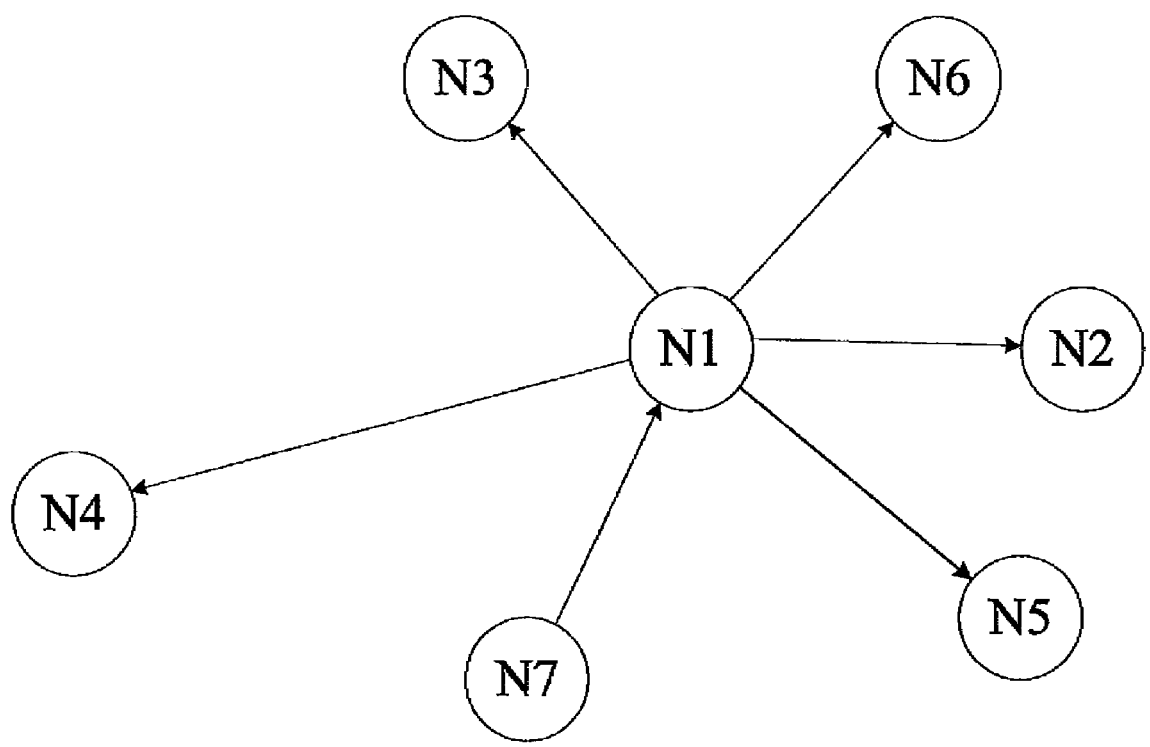
FIG. 1 depicts a schematic diagram of a conventional P2P network.

A peer-to-peer network, a method and a computer program product for a new node joining the network, and a computer readable medium thereof revealed in this invention are illustrated separately by the following embodiments. Please refer to FIG. 2 which shows a schematic diagram of a P2P network 200 utilizing the method of this invention. The network comprises a plurality of nodes 201, 202, 203, 204, 205, 206, 208, 209, 210 and a new node 207 which desires to join the network. A direction of each arrow in the diagram indicates a direction of a data flow. Each of the nodes 201 to 210 is an apparatus having a capability wireless transmission.

In detail, each of the nodes 201 to 210 in the P2P network comprises a partner list (not shown) for recording nodes available to provide data to the node having the partner list. The node recorded on each of the partner lists is partner nodes of the node having the partner list. For the node 203 as an example, the corresponding partner list records the nodes 208, 209 and 210. Consequently the nodes 208, 209 and 210 are partners of the node 203 capable of providing data to the node 203. Compared with the prior art, in the P2P network 200 disclosed by this invention, when the new node 207 wants to join to the network, the nodes of the network evaluate the loading condition of each node as a standard to determine a joining request from the node 207 rather than a random manner. Consequently, the P2P network 200 revealed in this invention can effectively enhance stability of the network and balance the network loading. As to the method for how the P2P network of the invention considers the loading condition of each node as a standard for accepting or refusing the new node can be referred to the following descriptions.

The following descriptions relate to a method for a new node joining the P2P network by using the aforementioned P2P network architecture of this invention. The method mainly comprises two mechanisms as a standard to consider whether to accept a new node joining the network or not. The first mechanism is a preferential random forwarding (PRF), and the second mechanism is a preferential random selection (PRS). Two embodiments will be illustrated individually in the following.

Figure 2:
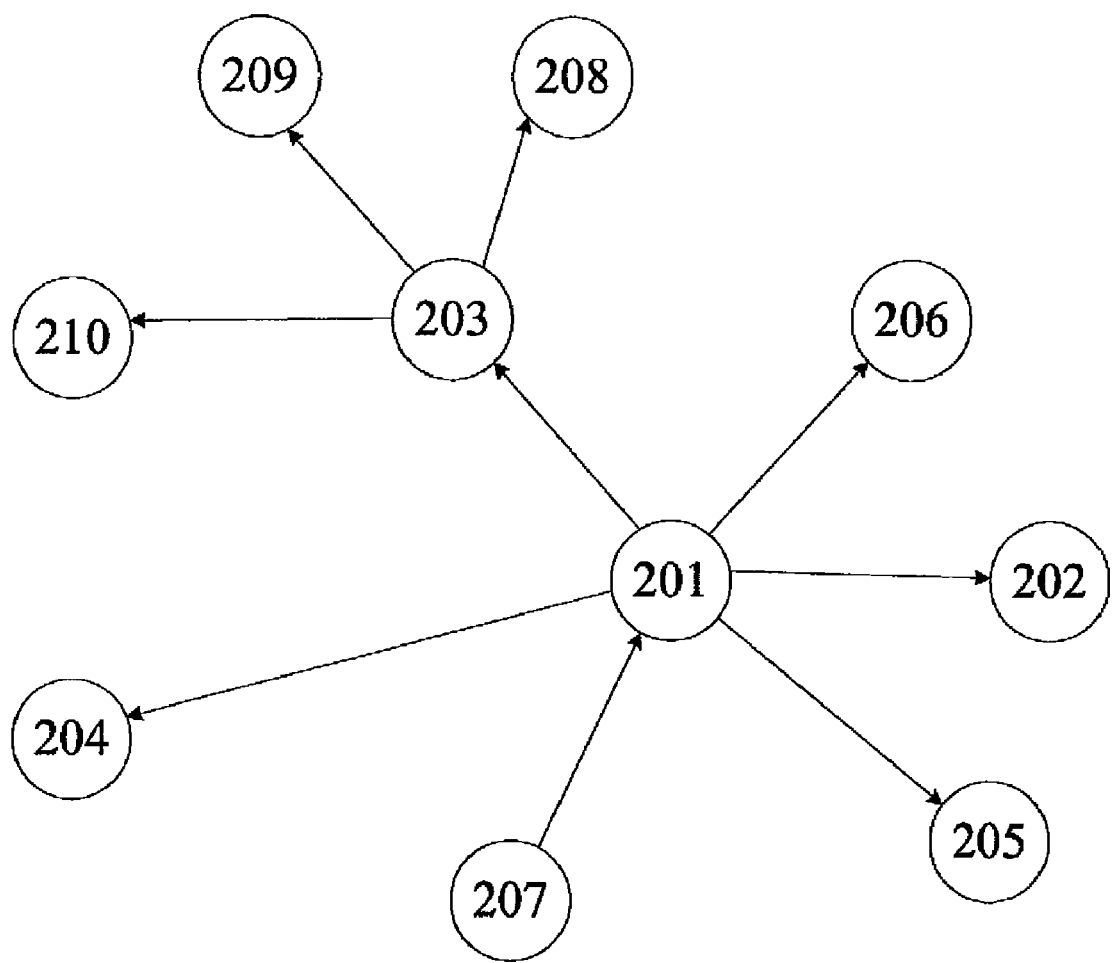
FIG. 2 depicts a schematic diagram of a P2P network in the first embodiment of the invention.
Figure 3:
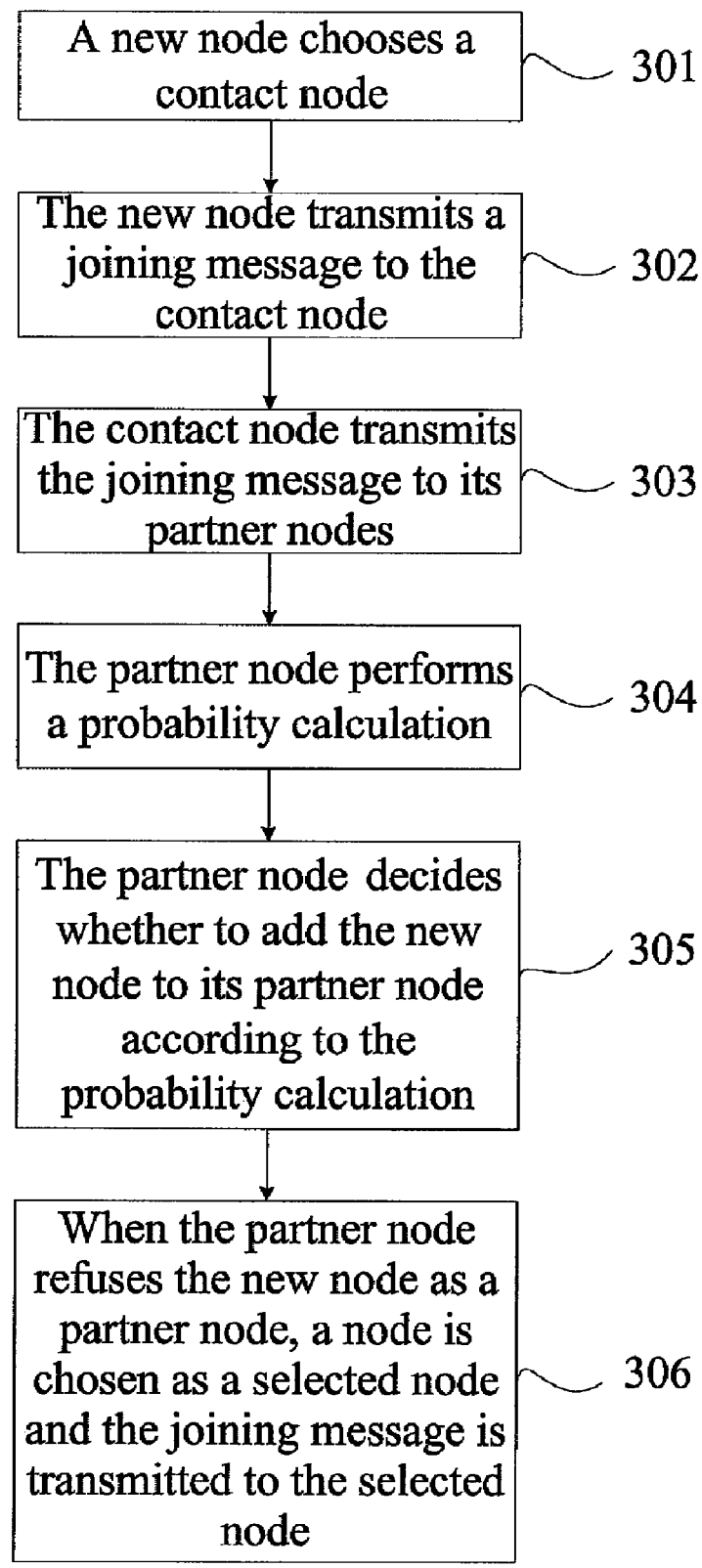
FIG. 3 depicts a flow chart of the PRF method in the second embodiment of the invention.

Please refer to FIG. 2 and FIG. 3 together. FIG. 3 shows a flow chart of joining a new node to the P2P network using the PRF method. The PRF method is different form the SCAMP technique which randomly chooses one of partner nodes and transmits the message to the partner node. Instead, a preferable choosing method is adopted to choose an object to transmit the joining message of the new node. In other words, a standard for the preferable choosing method is to choose the node having fewer partners as a chosen objects for data transmission. The method can reduce the possibility for the node disconnecting with the P2P group. The PRF method comprises the following steps.

In step 301, a new node 207 chooses one of a plurality of nodes in the P2P network 200 as a contact node. For example, a node 201 is chosen as the contact node.

In step 302, the new node 207 transmits a joining message for logging to the P2P network 200 to the contact node 201.

In step 303, the contact node 201 transmits the joining message to a plurality of partner nodes of the contact node 201 recorded in its partner list. In this embodiment, partner nodes of the contact node 201 comprise nodes 202, 203, 204, 205, and 206. Consequently, the contact node 201 transmits the joining message to nodes 202 to 206. A direction of the arrow in the diagram is a direction the joining message flows. To be emphasized is that the flow direction of the joining message is opposite to a direction for data transmission.

In step 304, partner nodes 202 to 206 of the contact node 201 execute a probability calculation respectively, wherein the probability calculation is to calculate a probability equation P to determine whether the partner nodes 202 to 206 accept the new node 207 as its partner node. The probability P equals to $1/(1+N)$, wherein N is a partner list number of each nodes.

In step 305, partner nodes 202 to 206 of the contact node 201 decide whether to add the new node 207 to their partner lists according to the probability calculation of the partner node conducting the probability calculation. That is, partner nodes 202 to 206 respectively decide whether to accept the new node 207 to become its partner node. Specifically, in this embodiment, the result of the probability calculation of the node 203 is smaller than a predetermined value given by the system, hence the node 203 refuses the new node 207 as its partner node. On the other hand, results of the probability calculation of nodes 202, 204, 205, and 206 are greater than the predetermined value, thus the new node 207 is accepted as a partner node of each of nodes 202, 204, 205, and 206.

It is noted that the predetermined value is a standard for determining the loading for each node in the P2P system. In other words, when a partner list number of one of partner nodes exceeds a certain number, the result of the probability calculation makes the probability P be smaller than the predetermined value. Consequently, the new node is refused to be a partner node. On the contrary, when a partner list number of one of partner nodes is smaller than the certain number, the result of the probability calculation makes the probability P be larger than the predetermined value. Consequently, the partner node accepts the new node as its partner node.

In step 306, when one of partner nodes of the contact node refuses the new node as its partner node, the partner node that makes the refuse decision executes the PRF method. That is, the partner node that makes the refusing decision chooses one of its partner nodes having a smaller partner list as a selected node, and the joining message of the new node is transmitted to the selected node. The selected node continues to determine whether to accept the new node as its partner node or not.

Specifically, in this embodiment, the partner node 203 of the contact node 201 refuses the new node 207 as its partner node. The partner node 203 executes the PRF method to determine which one of its partner nodes 208, 209, and 210 comprises a smallest partner list. Assumed that the partner node 203 determines the node 208 has the smallest partner list, the partner node 203 chooses the node 208 as the selected node. The joining message of the new node 207 is then transmitted to the node 208. The node 208 continues to determine whether to accept the new node 207 as its partner node.

In this embodiment, step 303 can further comprise a step of transmitting the joining message to a portion of partner nodes by the contact node 201. This step is used to increase an opportunity for the new node joining to the P2P network. In the preferred embodiment, the contact node 201 chooses a predetermined number of partner nodes and then transmits the joining message to the chosen partner nodes. For example, the contact node 201 chooses two nodes 204 and 205 among its partner nodes, and then transmits the joining message to nodes 204 and 205. Nodes 204 and 205 continue determine whether to accept the new node 207 as its partner node, respectively.

Figure 4:
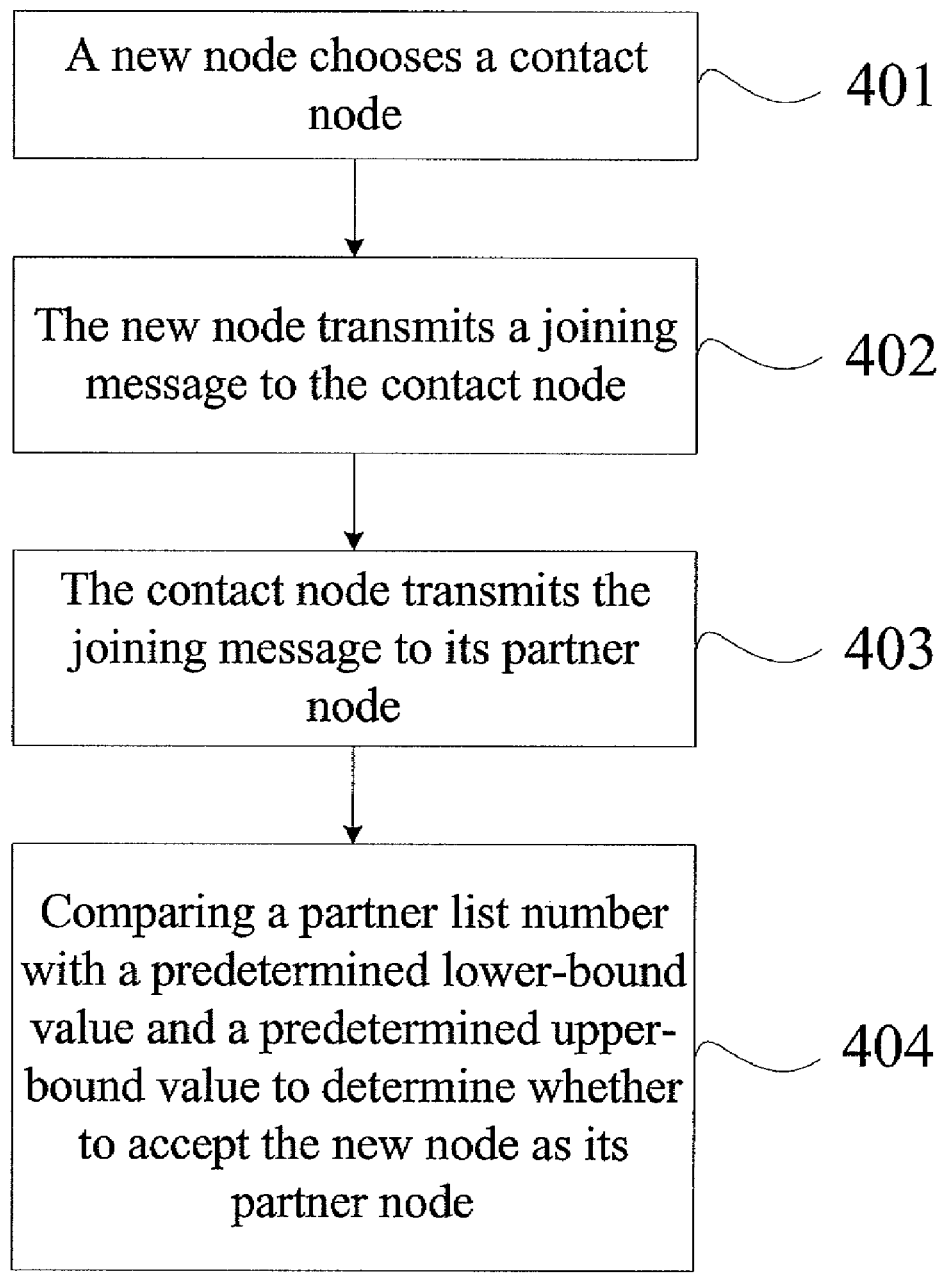
FIG. 4 depicts a flow chart of the PRS method in the second embodiment of the invention.
Figure 5:
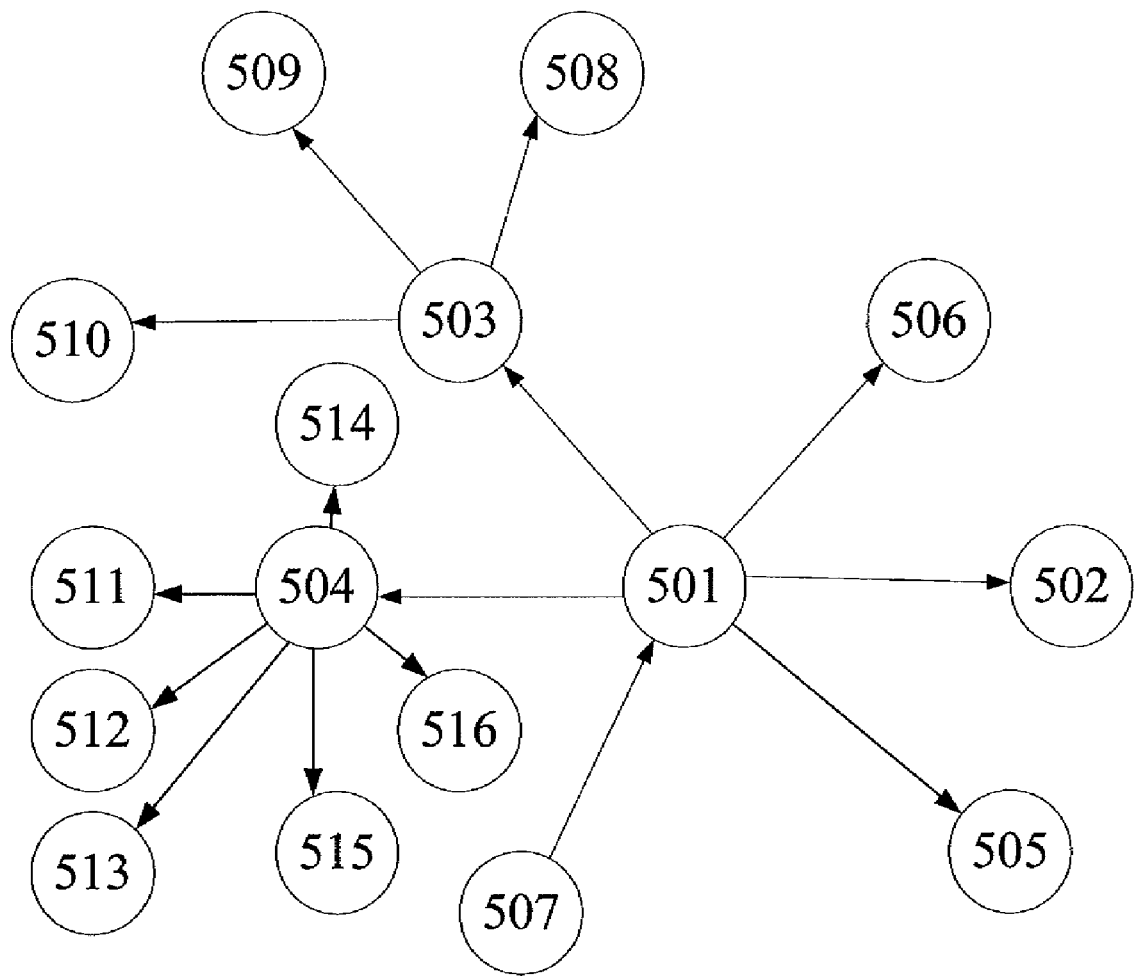
FIG. 5 depicts a schematic diagram of a P2P network of another embodiment of the invention.

Please refer to FIG. 4 and FIG. 5 together. FIG. 4 shows a flow chart of joining a new node to the P2P network using the PRS method. FIG. 5 shows a P2P network using the flow chart. The P2P network comprises a plurality of nodes 501, 502, 503, 504, 505, 506, 508, 509, 510, 511, 512, 513, 514, 515, 516 and a new node 507 which desires to join the network. A direction of each arrow in the diagram indicates a direction that a joining message flows. The method is also different form the SCAMP technique which randomly chooses one of partner nodes and transmits the message to the chosen partner node. Instead, the PRS method is adopted to preferentially select an object to transmit the joining message of the new node. The method can guarantee that a suitable partner number of nodes in the P2P network is maintained to increase stability of the P2P network. The PRS method comprises the following steps:

In step 401, a new node 507 chooses one of a plurality of nodes in a P2P network 500 as a contact node. For example, the node 501 is chosen as a contact node.

In step 402, the new node 507 transmits a joining message for logging to the P2P network 500 to the contact node 501.

In step 403, the contact node 501 transmits the joining message to the plurality of partner nodes recorded in the partner list of contact node 501. In this embodiment, partner nodes of the contact node 501 comprise nodes 502, 503, 504, 505, and 506. Consequently, the contact node 501 transmits the joining message to nodes 502 to 506.

In step 404, each of the partner nodes 502 to 506 of the contact node 501 decides whether to add the new node 507 to its partner list by comparing the partner list number with a predetermined lower-bound value and a predetermined upper-bound value.

The aforementioned step of comparing each partner list number of partner nodes 502 to 506 with the predetermined lower-bound value and the predetermined upper-bound value comprises three conditions as described below: the partner list number is smaller than the predetermined lower-bound value; the partner list number is between the predetermined lower-bound value and the predetermined upper-bound value; and the partner list number is greater than the predetermined upper-bound value. Nodes 502, 503 and 504 are used to illustrate in detail, respectively.

The first condition is that the node 502 determines its partner list number is smaller than the predetermined lower-bound value. Consequently, the node 502 adds the new node 507 to its partner list.

The second condition Is that the node 503 determines its partner list number is between the predetermined lower-bound value and the predetermined upper-bound value. Then, the node 503 executes the same step of the node 303 of the previous embodiment. That is, the probability calculation is performed for deciding whether to add the new node 507 to its partner list or not. Specifically, the node 503 executes the probability calculation for deciding whether to add the new node 507 to its partner list or not. If the node 503 refuses the new node 507 as its partner node, one node is chosen from its partner list as a selected node and the joining message is transmitted to the selected node.

The probability calculation described here is almost similar with the probability calculation of the previous embodiment. The only difference is that when the node 503 refuses the new node 507 as its partner node and chooses a node from partner nodes 508, 509 and 510 of the node 503, not only the aforementioned PRF method can be adopted for choosing a node with smaller partner number (such as node 508), but also a random manner may be adopted for choosing the selected node (for example, randomly chooses the node 510) to make the selected node (for example, the node 508 or the node 510) determine whether to accept the new node 507 as its partner node.

The third condition is that the node 504 determines its partner list number is greater than the predetermined upper-bound value. Therefore, the node 504 chooses one of partner nodes in its partner list as a substituted node and replaces the substituted node with the new node. Later, the joining message is transmitted to the substituted node. For example, when the partner list number of the node 504 is greater than the predetermined upper-bound value, the node 504 chooses a substituted node from its partner list. The partner nodes of the node 504 comprise nodes 511, 512, 513, 514, 515, and 516. The node 504 chooses the node 514 as the substituted node and replaces the node 514 with the node 507. In the meanwhile, partner nodes of the node 504 become nodes 507, 511, 512, 513, 515, and 516. The method of choosing a substituted node can be the PRF method or the manner of random selection.

It is noted that step 403 of the PRS method is similar to step 303 that can further comprise the step that the contact node selects a predetermined number of partner nodes and transmits the joining message to the selected portion of partner nodes. Please refer to the aforementioned description and the detailed description is neglected herein.

Briefly speaking, the PRS method mainly adopts a conditionally choosing manner for choosing a partner instead of using a probability selection purely. If a partner list number of a node is smaller than the lower-bound value, the new node is accepted to be added to its partner list. On the contrary, if the partner list number is greater than the upper-bound value, the new node is used to replace the node and the joining message is transmitted to the node being replaced. If the partner list number is between the lower-bound value and the upper-bound value, the probability calculation is adopted to determine whether to accept the new node as its partner. The method can guarantee that a suitable partner number is maintained in a node to increase stability of the P2P network.

In a real application, the PRF method can reduce 52% of instability for the P2P group. On the other hand, the PRS method can reduce 89% instability for the P2P group. Both methods can significantly enhance stability of the P2P group and accordingly balance loading of the P2P group.

The aforementioned methods can be physically implemented by using a computer program product. In other words, computer apparatuses having network transmission ability are installed with an appropriate computer program product for executing aforementioned steps. This invention can also utilize a computer readable medium to store a computer program for executing aforementioned steps. The computer readable medium can be a floppy disk, a hard disk, an optical disc, a flash disk, a tape, a database accessible from a network, or a storage medium with the same functionality that can be easily thought by people skilled in this field.

The above examples are only intended to illustrate the principle and efficacy of the subject invention, not to limit the subject invention. Any people skilled in this field may proceed with modifications and changes to the above examples without departing from the technical principle and spirit of the subject invention. Therefore, the scope of protection of the subject invention is covered in the following claims as appended.

What is claimed is:

1. A peer to peer (P2P) network, comprising:
a plurality of nodes, each of the nodes having a partner list for recording nodes being able to provide data to the node having the partner list, the nodes recorded on each of the partner lists being partner nodes of the node having the partner list; and
a new node,
wherein the new node chooses one of the nodes as a contact node and transmits a joining message to the contact node, the contact node transmits the joining message to its partner nodes, each of the partner nodes of the contact node conducts a probability calculation to calculate a probability P for the partner node conducting the probability calculation, the probability P equals to 1/(1+N), N is a number of partner nodes listed on the partner list of the partner node conducting the probability calculation, when the probability P is greater than a predetermined value, the partner node conducting the probability calculation accepts the new node as its partner nodes, when the probability P is smaller than the predetermined value, the partner node conducting the probability calculation refuses the new node to be its partner node, chooses its partner node having a smallest partner list as a selected node, and transmits the joining message to the selected node.

2. The P2P network of claim 1, wherein the contact node is one of the nodes.

3. A method for a new node joining a P2P network, comprising:
choosing one of a plurality of nodes as a contact node by the new node, wherein the P2P network comprises the nodes, each of the nodes has a partner list for recording nodes being able to provide data to the node having the partner list, the nodes recorded on each of the partner list being partner nodes of the node having the partner list;
transmitting a joining message to the contact node by the new code;
transmitting the joining message to the partner nodes of the contact node by the contact node;
conducting a probability calculation by each of the partner nodes of the contact node, wherein the probability calculation is to calculate a probability P for the partner node conducting the probably calculation, the probability P equals to 1/(1+N), N is a number of partner nodes listed on the partner list of the partner node conducting the probability calculation;
deciding whether to add the new node to its partner list by each of the partner nodes of the contact node according to the probability calculation of the partner node conducting the probability calculation, wherein when the probability P is smaller than a predetermined value, the partner node conducting the probability calculation refuses the new node to be its partner node, and when the probability P is greater than the predetermined value, the partner node conducting the probability calculation accepts the new node as its partner node;
choosing the partner node having a smallest partner list as a selected node from its partner list by each of the partner nodes deciding to refuse the new node; and
transmitting the joining message to each of the selected nodes by the corresponding partner node.

4. The method of claim 3, further comprising a step of transmitting the joining message to a portion of the partner nodes of the contact node by the contact node.

5. The method of claim 3, wherein the contact node is one of the nodes.

6. The method of claim 4, further comprising a step of randomly choosing a predetermined number of the partner nodes of the contact node as the portion of the partner nodes.

7. A method for a new node joining a P2P network, comprising:
choosing one of a plurality of nodes as a contact node by the new node, wherein the P2P network comprises the nodes, each of the nodes has a partner list for recording nodes being able to provide data to the node having the partner list, and the nodes recorded on each of the partner list being partner nodes of the node having the partner list;
transmitting a joining message to the contact node by the new code; and
transmitting the joining message to the partner nodes of the contact node by the contact node;
wherein the method further comprises the following steps for each of the partner nodes of the contact nodes:
determining whether a number of partner nodes listed on its partner list is between a predetermined lower-bound value and a predetermined upper-bound value;

if yes, conducting a probability calculation to calculate a probability P for the partner node conducting the probably calculation, the probability P equals to 1/(1+N), N is a number of partner nodes listed on the partner list of the partner node conducting the probability calculation;

deciding whether to add the new node to its partner list according to the probability P of the partner node conducting the probability calculation, wherein when the probability P is smaller than a predetermined value, the partner node conducting the probability calculation refuses the new node to be its partner node, and when the probability P is greater than the predetermined value, the partner node conducting the probability calculation accepts the new node as its partner node;

choosing one of the partner nodes as a selected node by the partner node; and transmitting the joining message to the selected node by the partner node choosing the selected node.

8. The method of claim 7, wherein the deciding step comprises the steps of:
determining whether the number is smaller than the predetermined lower-bound value; and
if yes, adding the new node to the partner list of the partner node.

9. The method of claim 7, wherein the deciding step comprises the steps of:
determining whether the number is greater than the predetermined upper-bound value;
if yes, choosing one of the partner nodes of the partner node as a substituted node to replace the substituted node with the new node; and
transmitting the joining message to the substituted node by the partner node choosing the substituted node.

10. The method of claim 7, wherein the selected node is one of the partner nodes of the partner node in the deciding step and the selected node has a smaller partner list among the partner nodes of the partner node in the deciding step.

11. The method of claim 7, wherein the selected node is randomly chosen from the partner nodes of the partner node in the deciding step.

12. The method of claim 7, further comprising a step of transmitting the joining message to a portion of the partner nodes of the contact node by the contact node.

13. The method of claim 7, wherein the contact node is one of the nodes.

14. The method of claim 9, wherein the substituted node is one of the partner nodes of the partner node in the deciding step and the substituted node has a smaller partner list among the partner nodes of the partner node in the deciding step.

15. The method of claim 9, wherein the substituted node is randomly chosen from the partner nodes of the partner node in the deciding step.

16. The method of claim 12, further comprising a step of randomly choosing a predetermined number of the partner nodes of the contact node as the portion of the partner nodes.

17. A non-transitory computer readable medium, storing an application program for executing a method for a new node joining a P2P network, the method comprising the following steps:
choosing one of a plurality of nodes as a contact node by the new node, wherein the P2P network comprises the nodes, each of the nodes has a partner list for recording nodes being able to provide data to the node having the partner list, and the nodes recorded on each of the partner list being partner nodes of the node having the partner list;
transmitting a joining message to the contact node by the new code;
transmitting the joining message to the partner nodes of the contact node by the contact node;
conducting a probability calculation by each of the partner nodes of the contact node, wherein the probability calculation is to calculate a probability P for the partner node conducting the probably calculation, the probability P equals to 1/(1+N), N is a number of partner nodes listed on the partner list of the partner node conducting the probability calculation;
deciding whether to add the new node to its partner list by each of the partner nodes of the contact node according to the probability calculation of the partner node conducting the probability calculation, wherein when the probability P is smaller than a predetermined value, the partner node conducting the probability calculation refuses the new node to be its partner node, and when the probability P is greater than the predetermined value, the partner node conducting the probability calculation accepts the new node as its partner node;
choosing the partner node having a smallest partner list as a selected node from its partner list by each of the partner nodes deciding to refuse the new node; and
transmitting the joining message to each of the selected nodes by the corresponding partner node.

18. The non-transitory computer readable medium of claim 17, further comprising a step of transmitting the joining message to a portion of the partner nodes of the contact node by the contact node.

19. The non-transitory computer readable medium of claim 17, wherein the contact node is one of the nodes.

20. The non-transitory computer readable medium of claim 18, further comprising a step of randomly choosing a predetermined number of the partner nodes of the contact node as the portion of the partner nodes.

21. A non-transitory computer readable medium, storing an application program for executing a method for a new node joining a P2P network, the method comprising the following steps:
choosing one of a plurality of nodes as a contact node by the new node, wherein the P2P network comprises the nodes, each of the nodes has a partner list for recording nodes being able to provide data to the node having the partner list, and the nodes recorded on each of the partner list being partner nodes of the node having the partner list;
transmitting a joining message to the contact node by the new code; and
transmitting the joining message to the partner nodes of the contact node by the contact node;
wherein the method further comprises the following steps for each of the partner nodes of the contact nodes:
determining whether a number of partner nodes listed on its partner list is between a predetermined lower-bound value and a predetermined upper-bound value;
if yes, conducting a probability calculation to calculate a probability P for the partner node conducting the probably calculation, the probability P equals to 1/(1+N), N is a number of partner nodes listed on the partner list of the partner node conducting the probability calculation;
deciding whether to add the new node to its partner list according to the probability P of the partner node conducting the probability calculation, wherein when the probability P is smaller than a predetermined value, the partner node conducting the probability calculation refuses the new node to be its partner node, and when the probability P is greater than the predetermined value, the partner node conducting the probability calculation accepts the new node as its partner node;

choosing one of the partner nodes as a selected node by the partner node; and transmitting the joining message to the selected node by the partner node choosing the selected node.

22. The non-transitory computer readable medium of claim 21, wherein the deciding step comprises the steps of:

determining whether the number is smaller than the predetermined lower-bound value; and if yes, adding the new node to the partner list of the partner node.

23. The non-transitory computer readable medium of claim 21, wherein the deciding step comprises the steps of:

determining whether the number is greater than the predetermined upper-bound value;

if yes, choosing one of the partner nodes of the partner node as a substituted node to replace the substituted node with the new node; and transmitting the joining message to the substituted node by the partner node choosing the substituted node.

24. The non-transitory computer readable medium of claim 21, wherein the selected node is one of the partner nodes of the partner node in the deciding step and the selected node has a smaller partner list among the partner nodes of the partner node in the deciding step.

25. The non-transitory computer readable medium of claim 21, wherein the selected node is randomly chosen from the partner nodes of the partner node in the deciding step.

26. The non-transitory computer readable medium of claim 21, further comprising a step of transmitting the joining message to a portion of the partner nodes of the contact node by the contact node.

27. The computer readable medium of claim 21, wherein the contact node is one of the nodes.

28. The non-transitory computer readable medium of claim 23, wherein the substituted node is one of the partner nodes of the partner node in the deciding step and the substituted node has a smaller partner list among the partner nodes of the partner node in the deciding step.

29. The non-transitory computer readable medium of claim 23, wherein the substituted node is randomly chosen from the partner nodes of the partner node in the deciding step.

30. The non-transitory computer readable medium of claim 26, further comprising a step of randomly choosing a predetermined number of the partner nodes of the contact node as the portion of the partner nodes.

* * * * *

UNITED STATES PATENT AND TRADEMARK OFFICE
CERTIFICATE OF CORRECTION

PATENT NO.        : 7,782,880 B2
APPLICATION NO.   : 11/696593
DATED             : August 24, 2010
INVENTOR(S)       : Chung-Yi Lai et al.

It is certified that error appears in the above-identified patent and that said Letters Patent is hereby corrected as shown below:

On the Title page item (75): Inventors: Please delete "Jayhsin Yao" and insert --Jeyhsin Yao--

Signed and Sealed this
Twenty-eighth Day of December, 2010

David J. Kappos
*Director of the United States Patent and Trademark Office*